(12) United States Patent
Tian et al.

(10) Patent No.: US 8,855,315 B2
(45) Date of Patent: Oct. 7, 2014

(54) METHOD AND SYSTEM FOR REALIZING SECURE FORKING CALL SESSION IN IP MULTIMEDIA SUBSYSTEM

(75) Inventors: Tian Tian, Shenzhen (CN); Yunwen Zhu, Shenzhen (CN); Yinxing Wei, Shenzhen (CN); Zhimeng Teng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 107 days.

(21) Appl. No.: 13/256,492

(22) PCT Filed: Jul. 21, 2009

(86) PCT No.: PCT/CN2009/072859
§ 371 (c)(1),
(2), (4) Date: Sep. 14, 2011

(87) PCT Pub. No.: WO2010/124482
PCT Pub. Date: Nov. 4, 2010

(65) Prior Publication Data
US 2012/0002816 A1 Jan. 5, 2012

(30) Foreign Application Priority Data

Apr. 30, 2009 (CN) .......................... 2009 1 0083288

(51) Int. Cl.
*H04L 9/08* (2006.01)
*H04L 9/30* (2006.01)
*G06F 21/10* (2013.01)
*H04L 9/32* (2006.01)

(52) U.S. Cl.
CPC .............. *H04L 9/0822* (2013.01); *H04L 9/321* (2013.01); *H04L 9/0833* (2013.01)
USPC ............................. 380/277; 380/270; 380/255

(58) Field of Classification Search
CPC ....... H04L 9/00; H04L 9/0811; H04L 9/0816; H04L 9/0838; H04L 9/0827; H04L 9/0841; H04L 9/0869

USPC ............ 379/266; 380/270, 277, 278, 30, 255; 713/160, 163, 168, 171; 726/8
See application file for complete search history.

(56) References Cited

U.S. PATENT DOCUMENTS

| | | | |
|---|---|---|---|
| 2003/0131236 A1* | 7/2003 | Sasmazel | 713/171 |
| 2007/0147600 A1* | 6/2007 | Stahlman et al. | 379/266.07 |
| 2008/0123849 A1 | 5/2008 | Samayamantry | |
| 2008/0240433 A1* | 10/2008 | Fahn et al. | 380/255 |
| 2009/0156242 A1 | 6/2009 | Wang | |

FOREIGN PATENT DOCUMENTS

CN  101110791 A  1/2008

OTHER PUBLICATIONS

3GPP TR33.828 V9.0.0 (Mar. 2010)3rd Generation Partnership Project, Technical Specification Group Services and System Aspects, IP Multimedia Subsystem (IMS) media plane security (Release 9).*
Oscar Olsson, Security Analysis of Key-Exchange Protocol Mikey-Ticket, 2010.*
3GPP TR 33.828 V1.0.0 Mar. 2009.
Chapter 12 : Key Establishment Protocols ED Oct. 1, 1996.
Supplementary European Search Report in European application No. 09843894.8, mailed on Dec. 12, 2012.
International Search Report in international application No. PCT/CN2009/072859, mailed on Feb. 11, 2010.
English Translation of the Written Opinion of the International Search Authority in international application No. PCT/CN2009/072859, mailed on Feb. 11, 2010.
IMS media plane security Mar. 2009.

* cited by examiner

*Primary Examiner* — Andrew Nalven
*Assistant Examiner* — Huan V Doan
(74) *Attorney, Agent, or Firm* — Oppedahl Patent Law Firm LLC

(57) ABSTRACT

The present invention relates to a method for realizing a secure forking call session, which comprises: performing authentication between a calling party and a KMS or between each called party and the KMS, and acquiring a shared key between the calling party and the KMS or a shared key between each called party and the KMS; generating a random number by the calling party and calling each called party through an IMS; generating a random number by each called party and acquiring a media root key from the KMS; generating a media key, which is shared with the calling party, by each called party according to the media root key and the random number generated by the called party; sending the media root key and the generated random number by a called response party in the called parties, who responds the call, to the calling party through the IMS network; generating a media key identical to that of the called response party by the calling party according to the media root key and the random number generated by the called response party; and performing a secure media session between the calling party and the called response party with the identical media key.

9 Claims, 7 Drawing Sheets

METHOD AND SYSTEM FOR REALIZING SECURE FORKING CALL SESSION IN IP MULTIMEDIA SUBSYSTEM

TECHNICAL FIELD

The present invention relates to security technology of network communications, particularly to a method and system for realizing a secure forking call session in an IP Multimedia Subsystem (IMS) based on an Otway-Rees key agreement protocol.

BACKGROUND

In a session initiation protocol (SIP) system, a forking call session is a very useful service, by which multiple terminals as a called party can be called simultaneously so as to improve a call completion rate. In an IMS, an SIP is used as a control protocol for various IP multimedia services. In the technical regulation of IMS media security, the forking call session has been ranked as a very important user scenario, and a corresponding security requirement also arises.

FIG. 1a and FIG. 1b show two scenario schematic diagrams of an existing forking call session respectively. FIG. 1a shows a case where the called party refers to a same user who registers multiple terminals, i.e. the multiple terminals have identical public user identification. Herein, the realization of forking call session will be illustrated by a simple example. As shown in FIG. 1a, it is supposed that the called party Bob has a landline phone (UE $B_3$), a mobile phone (UE $B_2$) and a PC (UE $B_1$), and the user Bob registers the three terminals to one common public user identification. When a calling party Alice (UE A) calls the called party Bob, the three terminals are called simultaneously, and the called party Bob can freely select one terminal to respond the call of the calling party Alice and perform a media session with a media key (for example, $K_{a-b1}$ or $K_{a-b2}$ or $K_{a-b3}$) between the selected terminal and the calling party.

FIG. 1b shows a case where the called party refers to multiple users, i.e. each called user has its own unique public user identification. As shown in FIG. 1b, it is supposed that the calling party (UE A) calls any user in a certain area, for example, calling SIP: *@DomainA.com (including UE B, UE C and UE D). Herein, the calling party does not know that the call is forked, and when one terminal has responded the call, other terminals cannot respond the call. This requires that the calling party and any terminal of the called party have unique media key (for example, $K_1$, $K_2$ and $K_3$ for user B, user C and user D respectively), and all terminals except the responding terminal cannot learn the session key already in use so as to guarantee that session contents will not be monitored by or released from other terminals.

In the technical regulation TR33.828 about media security in the IMS, TBS is proposed as an alternative scheme for solving security issues of the IMS media stream. The TBS scheme needs one trusted third party, i.e. a Key Management Server (KMS). FIG. 2 is a schematic diagram illustrating a structure of an existing key management system based on the TBS technology. As shown in FIG. 2, a UE establishes a trusted channel with the KMS by a Bootstrapping Service Function (BSF) through the authentication process of a General Bootstrapping Architecture (GBA), and proxy call session control function (P-CSCF) and service call session control function (S-CSCF) are net elements of the IMS core network. In the structure shown in FIG. 2, in order to realize the forking call session, TBS authentication is required. FIG. 3 is a flowchart illustrating the realization of forking call session by the existing TBS. As shown in FIG. 3, it is supposed that user A and user B have respectively established a secure connection with the KMS by means of the GBA, herein, if the GBA is unavailable, other existing authentication methods can be used for establishing the secure connection with the KMS. In order to establish a secure media channel between the user A and the user B, the following steps are included.

Step 301: a user A sends a ticket request for applying a ticket of a media key to a KMS.

Step 302: the KMS generates the media key and ticket of the user A, and feeds the media key (KT_A) and the ticket of the user A back to the user A.

Step 303-step 304: the user A generates one random number Mod_A, makes an INVITE message include the random number Mod_A and the ticket, and sends the message to the user B through the IMS network.

Step 305-step 306: a terminal of the user B receives the INVITE message, stores the random number Mod_A, makes a forking media key (KF_AB) request include the ticket, and sends the request to the KMS.

Step 307: the KMS receives the ticket, and generates one random number Mod_B after checking that the received ticket is consistent with the ticket fed back to the user A, and generates one forking media key (KF_AB) based on the KT_A of the user A and the random number Mod_B.

Step 308: the KMS sends the KF_AB and random number Mod_B to the terminal of the user B.

Step 309: the terminal of the user B sends the random number Mod_B to the user A.

Step 310: the user A generates the forking media key (KF_AB) based on the random number Mod_B and KT_A. Then, the user A and the user B carry out secure media session by using the identical KA_AB.

It is easy to see from the flowchart in FIG. 3 that media security of forking call session can be realized based on the TBS technology. However, on the one hand, the user needs to request the KMS for the ticket in the TBS solution, thus additional signaling interaction process is added. On the other hand, the KMS needs to generate corresponding random number and forking media key for each called terminal, thus the storage load and calculation load of the KMS are greatly increased.

In the technical regulation of media security of the IMS, except the TBS technology, an Otway-Rees key agreement protocol is another alternative scheme proposed together with the TBS scheme for solving the security issues of the IMS media stream. The Otway-Rees key agreement protocol is an authentication and password exchange protocol. Key agreement can be carried out based on the Otway-Rees key agreement protocol. However, for the forking call session, no practicable solution has been given based on the Otway-Rees key agreement protocol as yet. In combination with FIG. 1a, it is supposed that a calling party Alice calls a called party Bob, and the Otway-Rees key agreement protocol is described briefly.

First, the calling party Alice generates a message $E_{KAT}$ (I, A, B, $R_A$) comprising an index number I, name A of the calling party Alice, name B of the called party Bob and a random number $R_A$, and the message is encrypted by using a shared key between the calling party Alice and Trent; the calling party Alice sends the index number, the name A of the calling party Alice, the name B of the called party Bob and the message encrypted by the calling party Alice to the called party Bob. This is simply expressed as follows: A→B: I, A, B, $E_{KAT}$ (I, A, B, $R_A$).

Then, the called party Bob generates a message $E_{KBT}$ (I, A, B, $R_B$) comprising a new random number $R_B$, the index number I, the name A of the calling party Alice and the name B of the called party Bob, and the message is encrypted by using a shared key between the called party Bob and the Trent; the called party Bob sends the message encrypted by the calling party Alice, the index number I, the name A of the calling party Alice, the name B of the called party Bob and the message encrypted by the called party Bob to the Trent. This is simply expressed as follows: B→T: I, A, B, $E_{KAT}$ (I, A, B, $R_A$), $E_{KBT}$ (I, A, B, $R_B$).

Next, the Trent generates a random session key K and then generates two messages. One message is generated by encrypting the random number generated by the calling party Alice and the random session key K by using the shared key between the Trent and the calling party Alice, the other message is generated by encrypting the random number generated by the called party Bob and the random session key K by using the shared key between the Trent and the called party Bob. The Trent sends the two encrypted messages and the index number I to the called party Bob. This is simply expressed as follows: T→B: I, $E_{KAT}$ (K, $R_A$), $E_{KBT}$ (K, $R_B$).

Finally, the called party Bob forwards the received message that is encrypted by using the shared key between the Trent and the calling party Alice to the calling party Alice. This is simply expressed as follows: B→A: $E_{KAT}$ (K, $R_A$).

In the existing non-IMS system, a traditional technology for solving media security of SIP forking call session scenario is approximately as follows: a calling terminal and a called terminal respectively provide a key parameter for generating a media key and then finally come to an agreement on a media key by exchange of key parameters. For example, for an MIKEY-DH protocol, the calling terminal and the called terminal respectively provide half key parameter, exchange key parameters and come to an agreement on the key by Session Description Protocol (SDP) offer/answer mode and Diffie-Hellman key exchange (DH) algorithm. SDES (SDP Description) is similar to the MIKEY-DH protocol. The drawback of the SIP forking call session technology in the traditional non-IMS system is that, in the forking call session scenario, the calling terminal has to independently come to an agreement on the key with all forked called terminals, this dynamic key agreement has quite high requirement on processing capacity and calculation capacity of the calling terminal; and the MIKEY-DH protocol itself also may be threatened by DOS due to relatively large calculation load and may need the support of Public Key Infrastructure (PKI). In order to reduce the processing load as much as possible, generally a delay mechanism is added, i.e. none of called terminals sends a reply including a key parameter to the calling terminal until a certain terminal responds, then the responding terminal sends a key parameter so as to come to an agreement on the media key with the calling terminal. However, this method does not provide a new key agreement mechanism, just reduces the processing load of the calling terminal, besides, as the key agreement is not yet ended when response, the media stream at this time is not protected by encryption, thus resulting in a new delay problem that the calling terminal and the responding terminal have to come to an agreement on the media key after response. Therefore, on the one hand, the mode of adding delay mechanism is neither able to realize agreement on key, on the other hand, nor really solves the problems such as large processing load and high requirement on the calculation capacity.

SUMMARY

On that account, the present invention aims to provide a method for realizing a secure forking call session, which can provide a key agreement mechanism such that the secure forking call session can be realized in an IMS.

The present invention also aims to provide a system for realizing a secure forking call session, which can provide a key agreement mechanism such that the secure forking call session can be realized in an IMS.

In order to realize the above-mentioned purpose, the technical solution of the present invention is realized as follows.

A method for realizing a secure forking call session comprises:

performing authentication between a calling party and a Key Management Server (KMS) or between each called party and the KMS, and acquiring a shared key between the calling party and the KMS or a shared key between each called party and the KMS;

generating a random number by the calling party and calling each called party through an IP Multimedia Subsystem (IMS);

generating a random number by each called party and acquiring a media root key from the KMS;

generating a media key, which is shared with the calling party, by each called party according to the media root key and the random number generated by the called party;

sending the media root key and the generated random number by a called response party in the called parties, who responds the call, to the calling party through the IMS network;

generating a media key identical to that of the called response party by the calling party according to the media root key and the random number generated by the called response party; and performing a secure media session between the calling party and the called response party with the identical media key.

The method may further comprises:

refusing response of other called parties by the IMS network after the called response party in the called parties responds the call.

The step that the calling party calls each called party may comprise:

the calling party uses an INVITE message to call all called parties through the IMS network, the INVITE message at least includes a user ID of the calling party, a common user ID of the called parties and a message $E_{calling\ party}$ encrypted with the shared key between the calling party and the KMS, and the message $E_{calling\ party}$ comprises the random number generated by the calling party, the user ID of the calling party and the common user ID of the called parties.

The step that each called party generates a random number and acquires the media root key from the KMS may comprise:

after receiving the INVITE message, each called party generates its own random number and initiates its own media root key request to the KMS, the media root key request at least includes the user ID of the calling party, a user ID of the called party, the received message $E_{calling\ party}$ and a messages $E_{called\ party}$ of the called party encrypted with the shared key between the called party and the KMS, and the message $E_{called\ party}$ comprises the random number generated by the called party, the user ID of the calling party and the user ID of the called party;

the KMS uses the shared key with the calling party and the shared key with the called party to decrypt the message $E_{calling\ party}$ and the message $E_{called\ party}$ respectively, compares the decrypted user ID of the calling party, the common user ID of the called party and the user ID of the called party with plaintexts included in the media root key request, and generates the media root key after authenticating that the decrypted user ID of the calling party is consistent with that in the plaintexts, and authenticating that the user ID of the called party is consistent with the common user ID of the called party; and for each called party, the KMS encrypts the random number generated by the calling party, the random number generated by the called party and the media root key with the shared key between the KMS and the calling party, and encrypts the media root key with the shared key between the KMS and the called party to generates two encrypted messages, the two encrypted messages are sent to the called party; each called party decrypts the received messages with the shared key between itself and the KMS to obtain the media root key.

The step that each called party generates a media key which is shared between the called party and the calling party may comprise:

each called party generates the media key which is shared between itself and the calling party by using the obtained media root key and the random number generated by itself through predefined media Key Derivation Function (KDF).

The step that the called response party in the called parties, who responds the call, sends the media root key and the generated random number to the calling party may comprise:

the called response party sends a response message to the calling party through the IMS, and the called response party forwards the message obtained from the KMS to the calling party, wherein the message is encrypted with the shared key between the KMS and the calling party and includes the random number generated by the calling party, the random number generated by the called response party and the media root key.

The step that the calling party generates the media key identical to that of the called response party may comprise:

the calling party decrypts the received message by using the shared key with the KMS, wherein the received message includes the random number generated by the calling party, the random number generated by the called response party and the media root key which are encrypted with the shared key between the KMS and the calling party, and the calling party obtains the random number generated by the called response party and the media root key; and by using the decrypted media root key and the random number generated by the called response party, the calling party employs predefined KDF to generate the media key identical to that of the called response party.

The called party refers to multiple terminals of one user, and the terminals of the user have an identical user ID; or the called party refers to multiple users and each user has only one user terminal, and the users have a common user ID to which all users can be mapped.

The step of performing authentication between the calling party and the KMS or between each called party and the KMS may comprise:

establishing a security trust relationship between the calling party and the KMS or between each called party and the KMS through a GBA mode; and by the establishment of the trust relationship between the calling party and the KMS or between each called party and the KMS, a shared key is established between the calling party and the KMS or between each called party and the KMS.

A key management server (KMS) for realizing a secure forking call session comprises: an authentication unit, a shared key generation unit and a root key generation unit, wherein the authentication unit is configured to authenticate a calling party and each called party, and authenticate each called party when receiving a media root key request from each called party;

the shared key generation unit is configured to generate a shared key between the KMS and the calling party and a shared key between the KMS and each called party after the authentication unit authenticates the calling party and each called party, and send the shared keys to the calling party and each called party respectively; and the root key generation unit is configured to generate a media root key when the authentication unit receives the media root key request from a called party and the authentication unit authenticates that the called party is legal; and send the generated media root key to the called party so that the called party uses the obtained media root key and a random number generated by the called party to generate a media key between the called party and the calling party;

therefore, after the calling party calls the called parties through an IMS network, a called response party in the called parties, who responds the call, sends the media root key and a generated random number to the calling party, the calling party uses the obtained media root key and the random number generated by the called response party to generate a media key identical to that of the called response party, as a result, the calling party and the called response party can use the identical media key to perform a secure media session.

A terminal for realizing a secure forking call session comprises:

a calling module, which is configured to, when the terminal makes a call, pass authentication of a KMS which is used for realizing a secure forking call session to obtain a shared key, initiate a call to called parties through an IMS network, receive a response that is sent from a called response party through the IMS network, and employ a predefined KDF to generate a media key identical to that of the called response party; and use the generated identical media key to perform a secure media session with the called response party in the called parties; and/or a called module, which is configured to, when the terminal receives a call, pass authentication of the KMS to obtain a shared key, initiate a media root key request to the KMS after receiving the call from a calling party, receive a media root key from the KMS and employ a predefined KDF to generate a media key; if receiving a stop-responding message from the IMS network, the called module stops responding the call; otherwise, sends a response through the IMS network, and the called module uses the generated media key to perform a secure media session with the calling party.

A terminal for realizing a secure forking call session comprises: an authentication unit, a random number generation unit, a media key generation unit, a root key acquisition unit, a calling unit and a response unit, wherein the authentication unit is configured to pass authentication of a KMS which is used for realizing a secure forking call session to obtain a shared key when the terminal makes a call or is called;

the random number generation unit is configured to, when the terminal makes a call, generate a random number and notify the calling unit to start calling, when the terminal is called, receive a call from a calling party, generate a random number and send a notice to the root key acquisition unit;

the root key acquisition unit is configured to, when the terminal is called, receive the notice from the random number generation unit, initiate a media root key request to the KMS, receive a media root key from the KMS, and send the media root key to the media key generation unit;

the media key generation unit is configured to, when the terminal makes a call, receive a response that is sent by a called response party through an IMS network, employ a predefined KDF to generate a media key identical to that of the called response party in called parties; when the terminal is called, receive the media root key from the root key acquisition unit, employ the predefined KDF to generate a media key and notify the response unit;

the calling unit is configured to, when the terminal makes a call, receive the notice from the random number generation unit, initiate a call to the called parties through the IMS network, send the random number generated by the random number generation unit to the called parties, and perform a secure media session with the called response party in the called parties by using the media key which is generated by the media key generation unit and identical to that of the called response party in the called parties; and the response unit is configured to, when the terminal is called, transmit the response through the IMS network, and perform a secure media session with the calling party by using the media key which is generated by the media key generation unit and identical to that of the calling party, however, stop responding if receiving a stop-responding message from the IMS network.

DETAILED DESCRIPTION

A KMS in the present invention does not particularly refer to a certain device, just a general term of trusted third party for realizing management and distribution of key.

Figure 4:
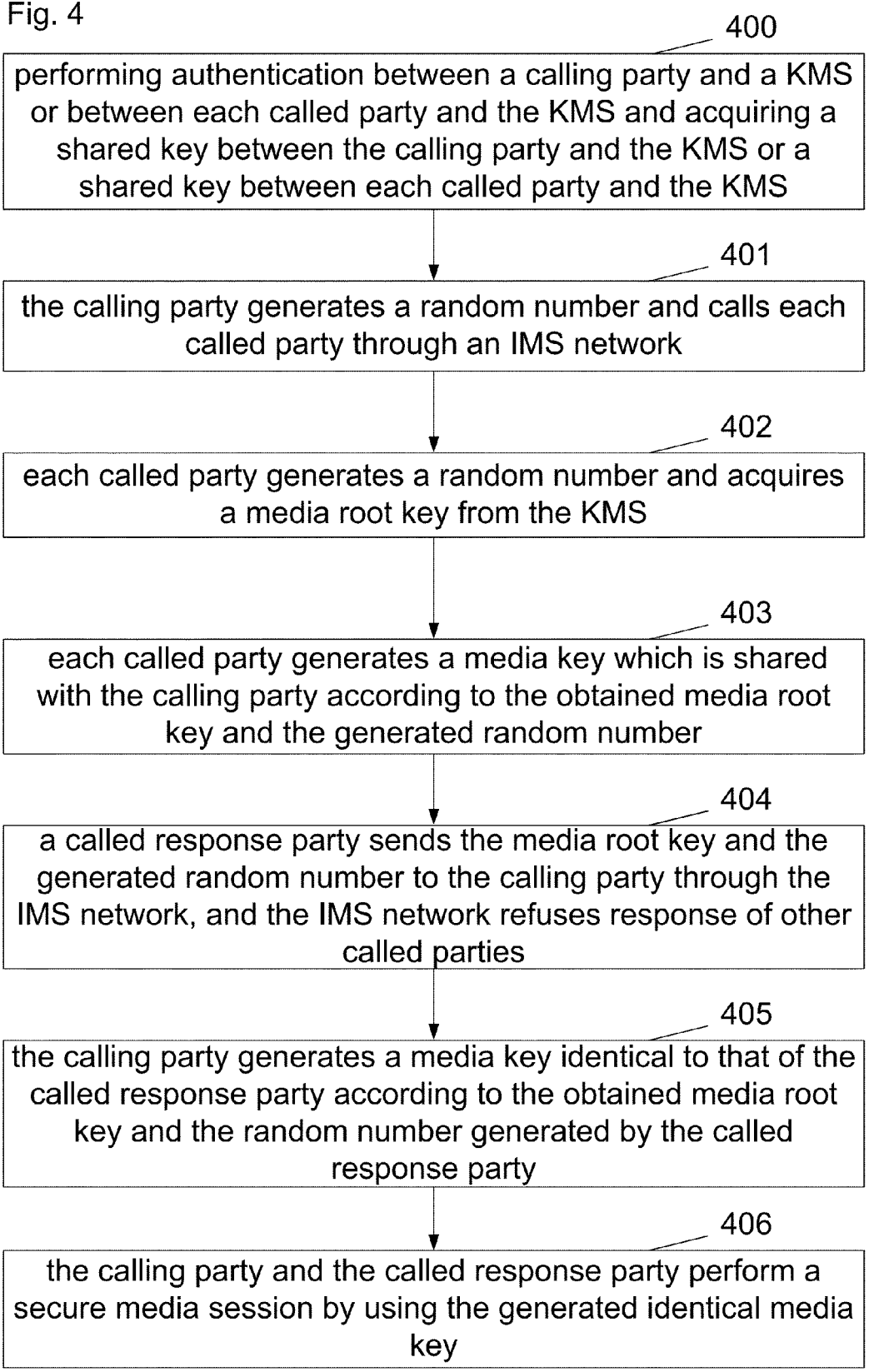
FIG. 4 is a flowchart illustrating a method for realizing a secure forking call session in the present invention.

FIG. 4 is a flowchart illustrating a method for realizing a secure forking call session in the present invention, as shown in FIG. 4, the method in the present invention comprises the following steps.

Step 400: performing authentication between a calling party and a KMS or between each called party and the KMS and acquiring a shared key between the calling party and the KMS or a shared key between each called party and the KMS.

The calling party and each called party respectively establish a security trust relationship with the KMS through a GBA mode or other modes; by the establishment of the trust relationship between the calling party and the KMS or between each called party and the KMS, the calling party and each called party establish a trusted relationship with each other, i.e. the shared key. The specific realization of the step is common technical means in the field, and will not be repeated in the present invention. The calling party generates one shared key with the KMS, and each called party generates one shared key with KMS.

Step 401: the calling party generates a random number and calls each called party through an IMS network.

If the called party refers to one user with multiple terminals, the terminals of the user have an identical user ID, i.e. a common user ID of the called parties; if the called party refers to multiple users (and each user has only one user terminal), the users have a group ID to which all users can be commonly mapped, i.e. a common user ID of the called parties.

The calling party uses an INVITE message to call all called parties through the IMS network. The INVITE message at least includes the user ID of the calling party, the common user ID of the called parties and a message $E_{calling\ party}$ encrypted with the shared key between the calling party and the KMS, the message $E_{calling\ party}$ comprises the random number generated by the calling party, the user ID of the calling party and the common user ID of the called parties.

Step 402: each called party generates a random number and acquires a media root key from the KMS.

The step specifically comprises: after receiving the INVITE message, each called party generates its own random number and initiates its own media root key request to the KMS, the media root key request at least includes the user ID of the calling party, the user ID of the called party, the received message $E_{calling\ party}$ and a message $E_{called\ party}$ of the called party encrypted with the shared key between the called party and the KMS, and the message $E_{called\ party}$ comprises the random number generated by the called party, the user ID of the calling party and the user ID of the called party.

The KMS uses the shared key with the calling party and the shared key with the called party to decrypt the message $E_{calling\ party}$ and the message $E_{called\ party}$ respectively, compares the decrypted user ID of the calling party, the common user ID of the called party and the user ID of the called party with the plaintexts included in the media root key request, and generates the media root key after authenticating that the decrypted user ID of the calling party is consistent with that in the plaintexts, and authenticating that the user ID of the called party is consistent with the common user ID of the called party.

For each called party, the KMS encrypts the random number generated by the calling party, the random number generated by the called party and the media root key with the shared key between the KMS and the calling party, encrypts the media root key with the shared key between the KMS and the called party, then two encrypted messages are sent to the called party; each called party decrypts the received messages with the shared key between itself and the KMS to obtain the media root key.

Step 403: each called party generates a media key which is shared with the calling party according to the obtained media root key and the generated random number.

Each called party generates the media key which is shared between itself and the calling party by using the media root key and the random number generated by itself through predefined KDF.

Step 404: a called response party sends the media root key and the generated random number to the calling party through the IMS network, and the IMS network refuses response of other called parties.

The called response party in the called parties, who responds the current call of the calling party, sends a response message to the calling party through the IMS, and the called response party forwards the message obtained from the KMS to the calling party, wherein the message is encrypted with the shared key between the KMS and the calling party and includes the random number generated by the calling party, the random number generated by the called response party and the media root key.

The IMS network sends a stop-responding message, such as CANCEL message, to the other called parties after receiving the response message of the called response party, so that the other called parties cannot respond the current call of the calling party any more.

Step 405: the calling party generates a media key identical to that of the called response party according to the obtained media root key and the random number generated by the called response party.

The calling party decrypts the received message by using the shared key with the KMS, wherein the received message includes the random number generated by the calling party, the random number generated by the called response party and the media root key which are encrypted with the shared key between the KMS and the calling party, and the calling party obtains the random number generated by the called response party and the media root key; and then, by using the decrypted media root key and the random number generated by the called response party, the calling party employs the predefined KDF to generate the media key identical to that of the called response party. It should be noted that the predefined KDF in the calling party is identical to that in the called parties.

Step 406: the calling party and the called response party perform a secure media session by using the generated identical media key.

The calling party and the called response party can encrypt the media session with the generated media key so as to realize a secure forking call session, and only the called response party in the called parties knows the media key, other non-response called parties cannot learn the media key.

Figure 5:
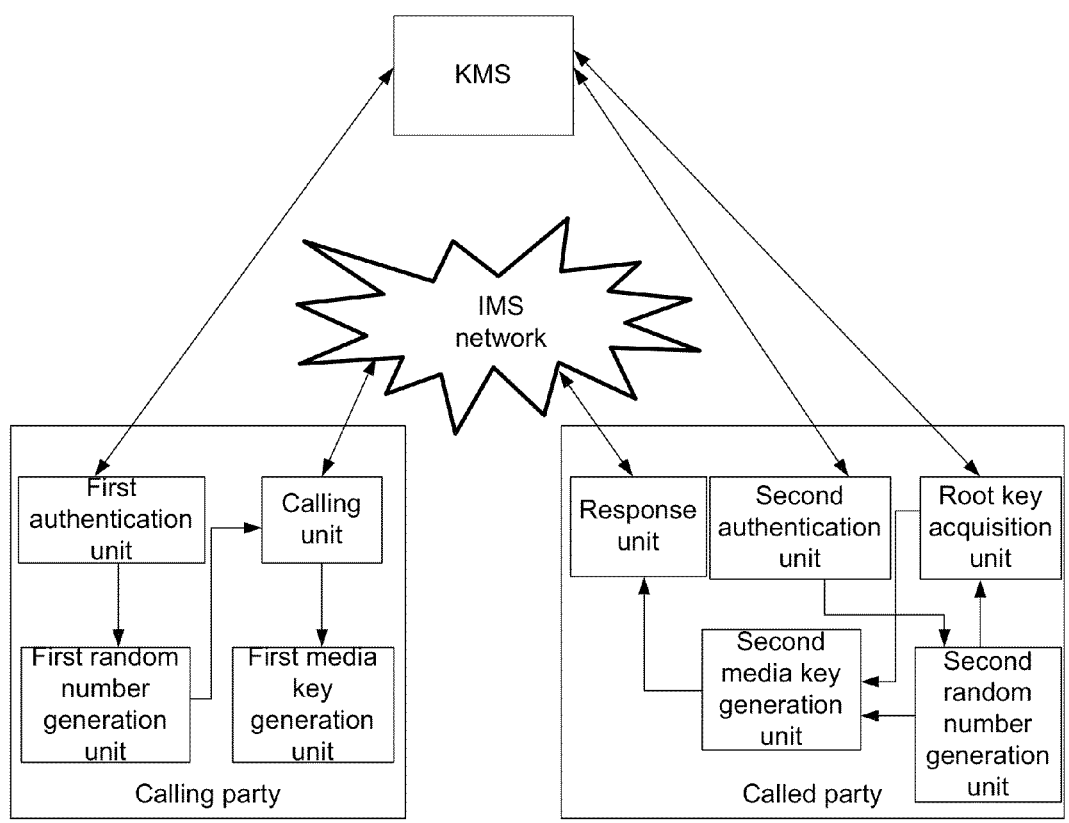
FIG. 5 is a schematic diagram illustrating a structure of a system for realizing a secure forking call session in the present invention.

Correspondence to the method shown in FIG. 4, a system for realizing a secure forking call session is also proposed. FIG. 5 is a schematic diagram illustrating a structure of a system for realizing a secure forking call session in the present invention. As shown in FIG. 5, the system in the present invention comprises a KMS, a calling party and called parties, and identical KDF is set between the calling party and the called parties, wherein the KMS is used for authenticating the calling party and each called party and generating shared keys thereof; when receiving a media root key request from a called party, generating a media root key after authenticating that the called party is legal, and sending the generated media root key to the called party;

the calling party is used for passing the authentication of the KMS and obtaining the shared key, initiating a call to the called parties through an IMS network, receiving a response from a called response party that is transmitted through the IMS network, employing a predefined KDF to generate a media key identical to that of the called response party; and performing a secure media session with the called response party in the called parties by using the generated media key; and each called party is used for passing the authentication of the KMS and obtaining the shared key, initiating the media root key request to the KMS after receiving the call of the calling party, receiving the media root key from the KMS and employing the predefined KDF to generate the media key; the called response party in the called parties transmits the response through the IMS network and performs the secure media session with the calling party by using the generated media key, and the other called parties receive a stop-responding message from the IMS network.

The called parties may be multiple terminals of one user, and the terminals of the user have an identical user ID, i.e. a common user ID of the called parties, also the called parties may be multiple users (and each user only has one user terminal), and the users have a group ID to which all users can be mapped, i.e. a common user ID of the called parties.

The calling party at least comprises a first authentication unit, a first random number generation unit, a first media key generation unit and a calling unit, wherein the first authentication unit is used for passing the authentication of the KMS and obtaining the shared key;

the first random number generation unit is used for generating a random number and notifying the calling unit to start calling;

the first media key generation unit is used for receiving the response from the called response party that is transmitted through the IMS network, and employing the predefined KDF to generate the media key that is identical to that of the called response party; and the calling unit is used for receiving the notice from the first random number generation unit, initiating a call to the called parties through the IMS network, and sending the random number generated by the calling party to each called party; and performing the secure media session with the called response party in the called parties by using the media key generated by the first media key generation unit.

Each called party at least comprises a second authentication unit, a second random number generation unit, a root key acquisition unit, a second media key generation unit and a response unit, wherein the second authentication unit is used for passing the authentication of the KMS and obtaining the shared key;

the second random number generation unit is used for receiving the call from the calling party, generating a random number and sending a notice to the root key acquisition unit;

the root key acquisition unit is used for receiving the notice from the second random number generation unit and initiating the media root key request to the KMS; receiving the media root key from the KMS and sending it to the second media key generation unit;

the second media key generation unit is used for receiving the media root key from the root key acquisition unit, employing the predefined KDF to generate the media key and notifying the response unit; and the response unit is used for transmitting the response of the called response party in the called parties through the IMS network, and performing the secure media session with the calling party by using the media key generated by the second media key generation unit; and the response units of the other called parties receive the stop-responding message from the IMS network.

Based on the system for realizing the secure forking call session, it is easy to understand that the present invention may comprise the devices at the operator side and devices at the user terminal side.

At the operator side, the present invention can provide a Key Management Server (KMS) for realizing a secure forking call session, and the KMS may comprise an authentication unit, a shared key generation unit and a root key generation unit, wherein each unit may be configured according to the description of the KMS in the FIG. 5 and the description of the method in FIG. 4.

At the user terminal side, the present invention can provide a terminal for realizing a secure forking call session, the terminal may comprise a calling module and a called module, and the two modules can be respectively configured in correspondence to the calling party and the called parties in FIG. 5. In some situations, the user terminal may only comprise a calling module or only comprise a called module so as to realize specific function.

Besides, at the user terminal side, the present invention also can provide a terminal for realizing a secure forking call session, the terminal comprises an authentication unit, a random number generation unit, a media key generation unit, a root key acquisition unit, a calling unit and a response unit, all units still can be configured based on the functions of all units in the calling party or the called parties in FIG. 5. When the terminal is used as a calling party, the units involved with the calling party are used; when the terminal is used as a called party, the units involved with the called party are used; wherein some units with identical functions can be combined, for example, the first authentication unit and the second authentication unit in FIG. 5 can be realized as a single authentication unit herein, i.e. when the terminal is used as a calling party, the authentication unit is equivalent to the first authentication unit, and when the terminal is used as a called party, the authentication unit is equivalent to the second authentication unit.

The method in the present invention will be described in details below in combination with embodiments. It is supposed that each user establishes a trust relationship with the KMS and generates a shared key with the KMS through a key agreement protocol. If GBA is unavailable, the user can obtain the shared key with the KMS by other authentication modes.

Figure 1A:
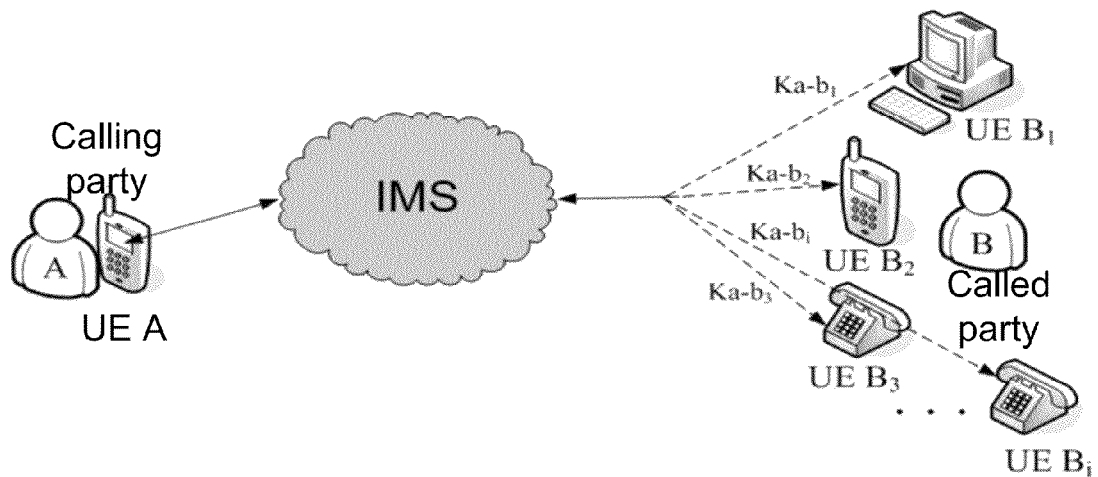
FIG. 1a is a schematic diagram illustrating a scenario of an existing forking call session.
Figure 6:
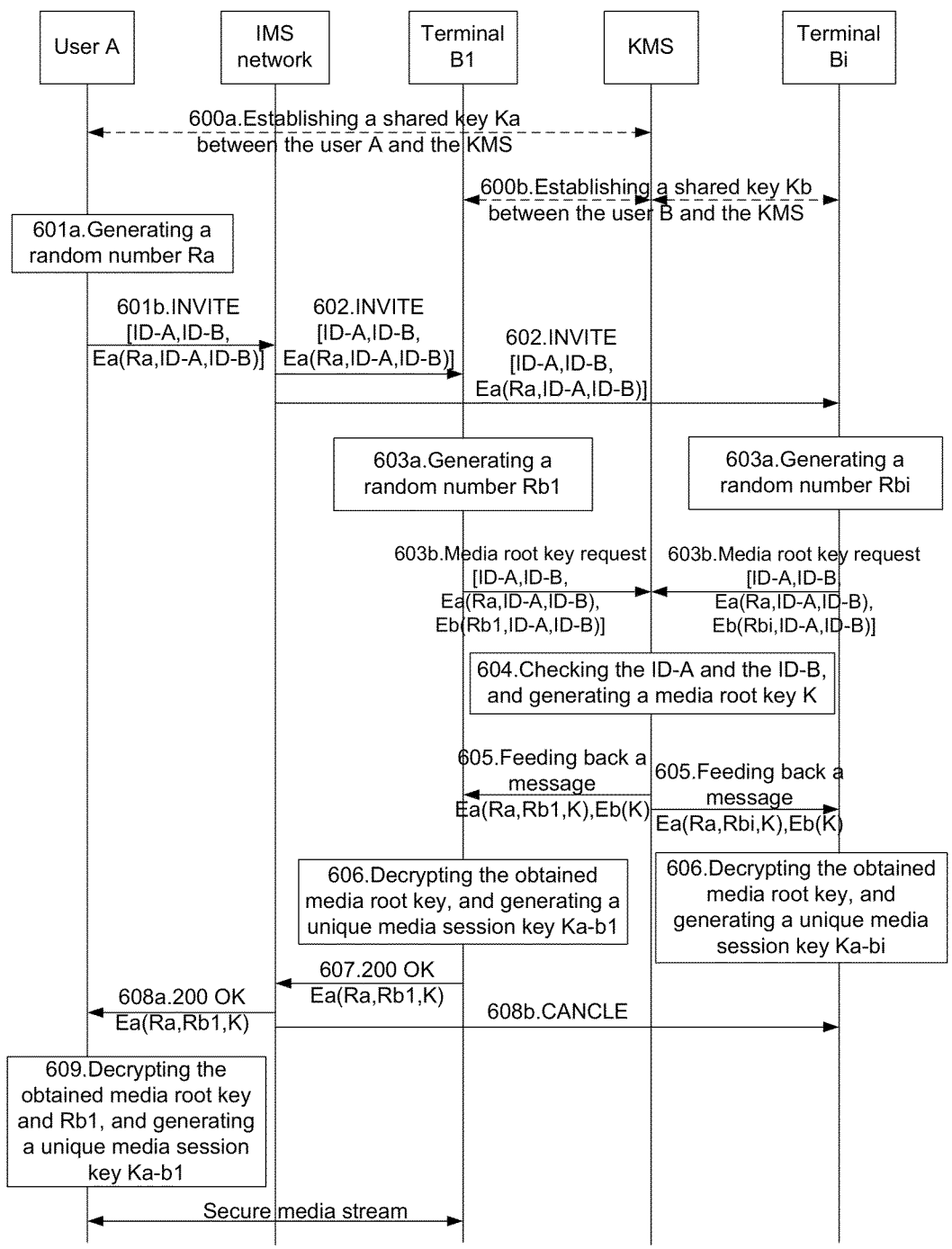
FIG. 6 is a flowchart illustrating a first embodiment of realizing a secure forking call session in the present invention.

Corresponding to the application scenario in FIG. 1a, FIG. 6 is a flowchart illustrating a first embodiment of realizing a secure forking call session in the present invention. FIG. 6 shows a key agreement process of a forking call session when the calling party is user A, the user ID of the user A is ID-A, the called party is user B and user B has multiple registered terminals. It is supposed that terminal B1 is a response terminal, other terminals are expressed as Bi, and a common user ID of the called party is ID-B. Identical KDF is set in all terminals of the user A and user B. The detailed implementation step comprises the following steps.

Step 600a: performing authentication between the user A and a KMS and generating a shared key Ka.

Step 600b: performing authentication between each terminal of the user B and the KMS and generating a shared key Kb.

Step 601a: the user A generates a random number Ra.

Step 601b: the user A sends a call request (INVITE) to the user B through the IMS network, the INVITE includes the following parameters: ID-A, ID-B and Ea (Ra, ID-A, ID-B), wherein Ea (Ra, ID-A, ID-B) is a message encrypted with the shared key Ka, including the Ra, the ID-A and the ID-B.

Step 602: the IMS network continuously sends the INVITE of the user A to each terminal of the user B, i.e. the terminal B1 and terminal Bi.

Step 603a: each terminal of the user B generates a random number after receiving the INVITE of the user A, in other words, the terminal B1 generates a random number Rb1 and the terminal Bi generates a random number Rbi.

Step 603b: each terminal of the user B sends a request for acquiring a media root key to the KMS, that is, the request sent by the terminal B1 comprises ID-A, ID-B, Ea (Ra, ID-A, ID-B) and Eb (Rb1, ID-A, ID-B), and the request sent by the terminal Bi comprises ID-A, ID-B, Ea (Ra, ID-A, ID-B) and Eb (Rbi, ID-A, ID-B).

The Eb (Rb1, ID-A, ID-B) is a message encrypted by the terminal B1 with the shared key Kb, including the Rb1, the ID-A and the ID-B; and the Eb (Rbi, ID-A, ID-B) is a message encrypted by the terminal Bi with the shared key Kb, including the Rbi, the ID-A and the ID-B.

Step 604: the KMS decrypts the received Ea (Ra, ID-A, ID-B) with the shared key Ka, decrypts the received Eb (Rb1, ID-A, ID-B) and each Eb (Rbi, ID-A, ID-B) with the shared key Kb, compares the result of decryption with the received plaintexts of ID-A and ID-B, and generates a media root key K if authentication is successful, i.e. the result of decryption is consistent with the received plaintexts of ID-A and ID-B.

Step 605: the KMS encrypts the random numbers Ra, Rb1 and the root key K with the shared key Ka to obtain a message Ea (Ra, Rb1, K), encrypts the root key K with the shared key Kb to obtain a message Eb (K) and then sends the two messages Ea (Ra, Rb1, K) and Eb (K) to the terminal B1 of the user B;

the KMS encrypts the random number Ra, Rbi and the root key K with the shared key Ka to obtain a message Ea (Ra, Rbi, K), encrypts the root key K with the shared key Kb to obtain a message Eb (K), and then sends the two messages Ea (Ra, Rbi, K) and Eb (K) to the other terminals Bi of the user B.

Step 606: the terminal B1 of the user B obtains Eb (K), decrypts the Eb (K) with the shared key Kb to obtain the media root key K, and employs the predefined KDF to generate a media key Ka–b1=KDF (K, Rb1) which is shared with the user A according to the media root key K and the random number Rb1 generated by itself; the terminal Bi of the user B obtains Eb (K), decrypts the Eb (K) by the shared key Kb to obtain the root key K, and employs the predefined KDF to generate a media key Ka–bi=KDF (K, Rbi) which is shared with the user A according to the media root key K and the random number Rbi generated by itself.

Step 607: the terminal B1 of the user B, who responds the call, sends an OK response to the user A through the IMS network, and sends the message Ea (Ra, Rb1, K) to the user A together with the OK response.

Step 608a: the IMS network forwards the OK response sent by the terminal B1 to the user A.

Step 608b: the IMS network sends a CANCEL message to the other terminals (UE Bi) of the user B to stop the terminal Bi of the user B responding to the call.

Step 609: the user A receives the OK response, decrypts the message Ea (Ra, Rb1, K) with the shared key Ka to obtain the Ra, Rb1 and the media root key K, and employs the predefined KDF to generate the media key Ka–b1=KDF (K, Rb1) which is shared with the terminal B1. Only the response terminal B1 of the user B knows the media key, and the terminal Bi of the user B cannot learn it.

According to the steps in FIG. 6, the secure media session can be realized between user A and user B with the Ka–b1 encryption.

Figure 1B:
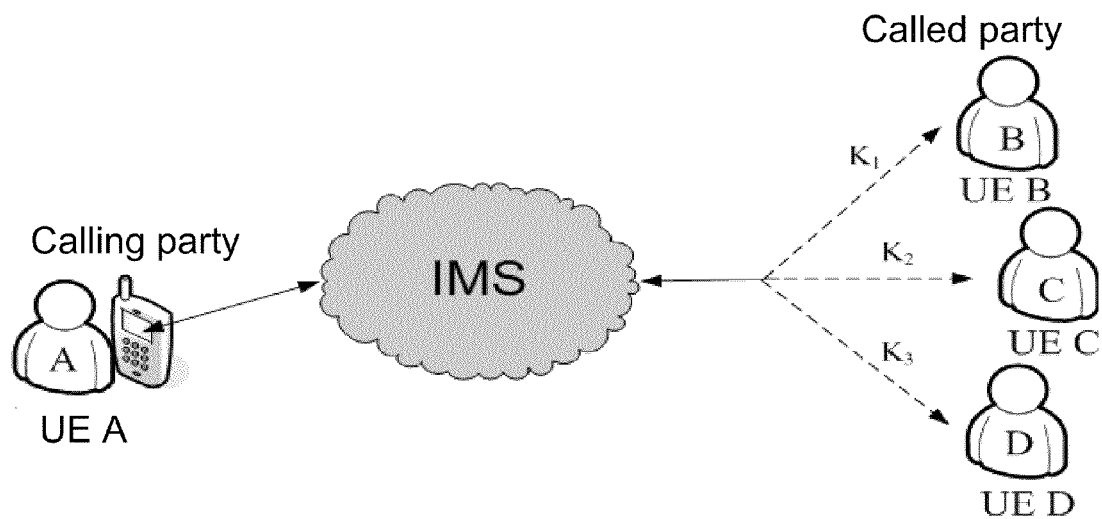
FIG. 1b is a schematic diagram illustrating another scenario of an existing forking call session.
Figure 2:
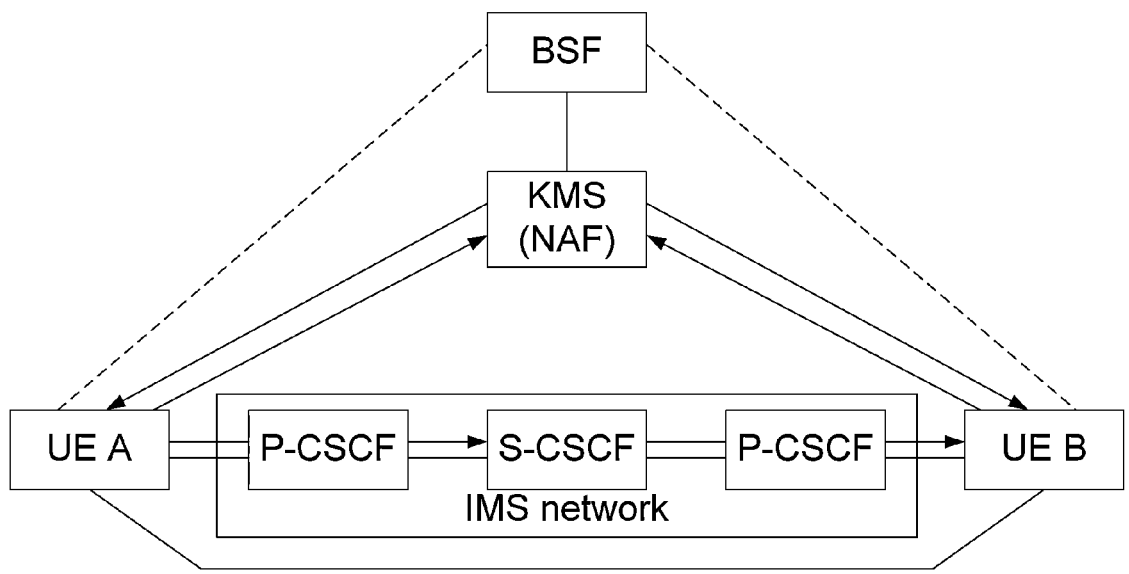
FIG. 2 is a schematic diagram illustrating a structure of an existing key management system based on the TBS technology.
Figure 3:
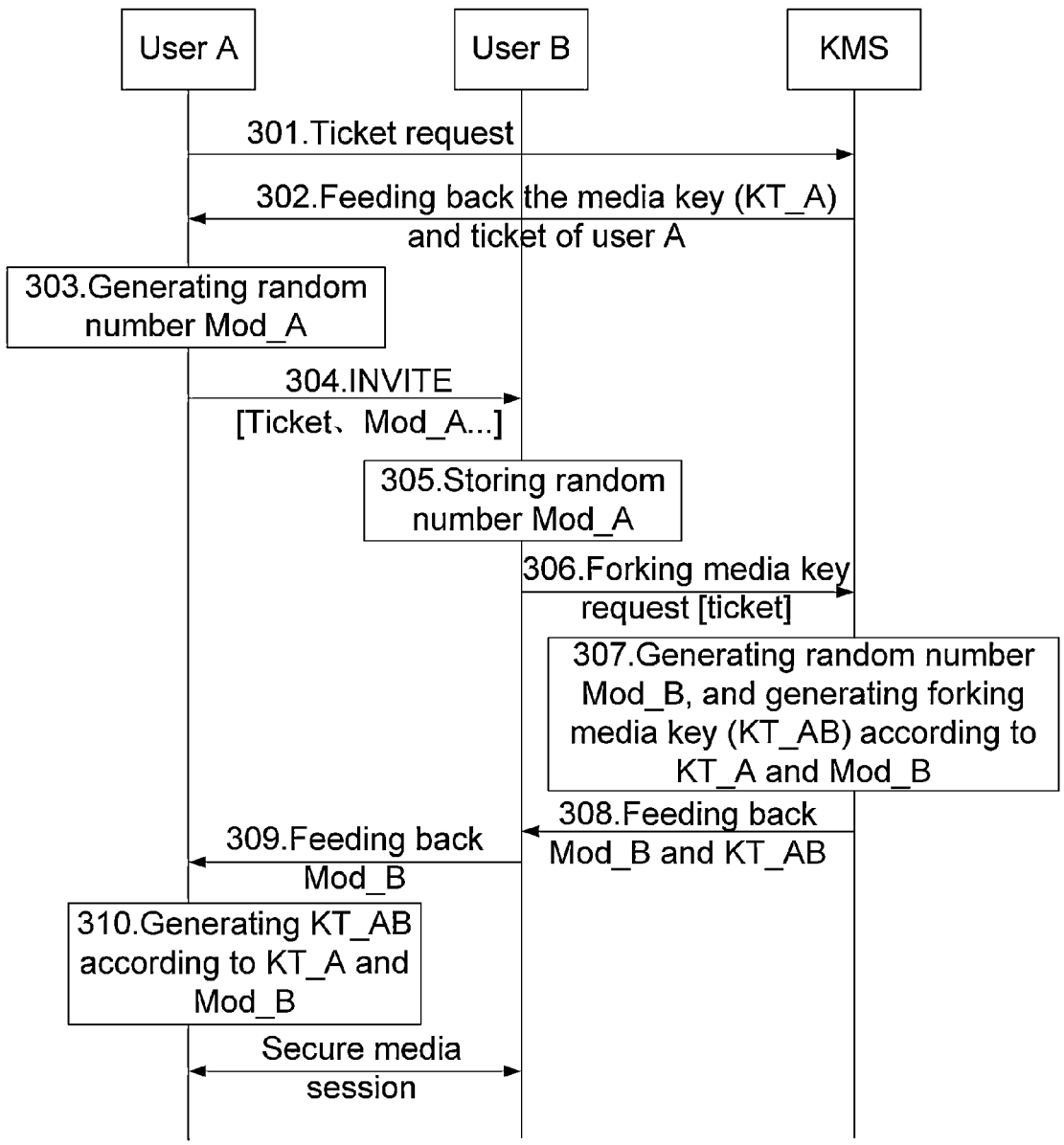
FIG. 3 is a flowchart illustrating a realization of forking call session by the existing TBS.
Figure 7:
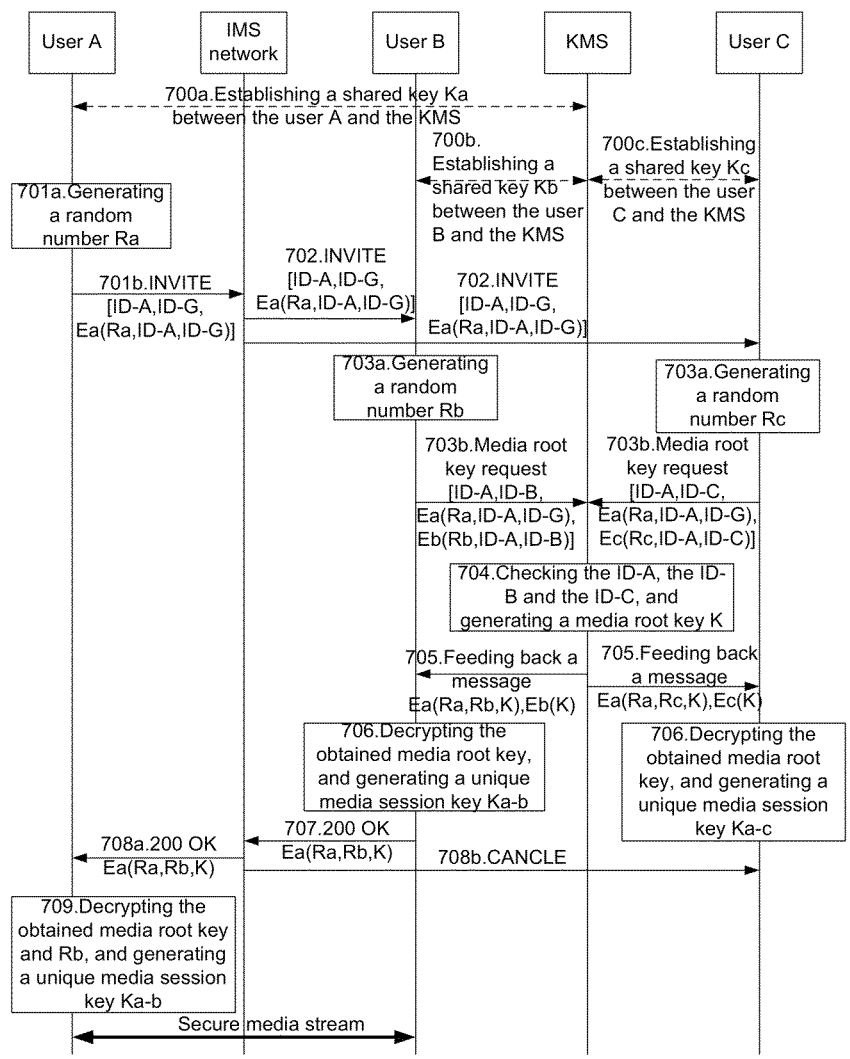
FIG. 7 is a flowchart illustrating a second embodiment of realizing a secure forking call session in the present invention.

Corresponding to the application scenario in FIG. 1b, FIG. 7 is a flowchart illustrating a second embodiment of realizing a secure forking call session in the present invention. FIG. 7 shows a key agreement process of a forking call session when the called party refers to multiple users (each user has only one terminal), it is supposed that the calling party is user A, the user ID of the user A is ID-A, the called parties comprises user B (the user ID thereof is ID-B) and user C (the user ID thereof is ID-C), the user B is a response user, other users are expressed as the user C, ID-G is a group user name to which the user B and the user C can be mapped, i.e. a common user ID of the called parties is ID-G. Identical KDF is respectively set in the user A, the user B and the user C. The detailed implementation step comprises the following steps.

Step 700a: performing authentication between the user A and the KMS and generating a shared key Ka.

Step 700b and step 700c: performing authentication between the user B and the KMS and between the user C and the KMS, and generating shared keys Kb and Kc respectively.

Step 701a: the user A generates a random number Ra.

Step 701b: the user A sends a call request (INVITE) to the user B and the user C through the IMS network, the INVITE includes the following parameters: ID-A, ID-G and Ea (Ra, ID-A, ID-G), wherein Ea (Ra, ID-A, ID-G) is a message encrypted with the shared key Ka, including the Ra, the ID-A and the ID-G.

Step 702: the IMS network sends the INVITE of the user A to the user B and the user C.

Step 703a: after receiving the INVITE of the user A, the user B generates a random number Rb, and the user C generates a random number Rc.

Step 703b: the user B and the user C respectively send a request for acquiring a media root key to the KMS, that is, the request sent by the user B comprises the ID-A, the ID-B, Ea (Ra, ID-A, ID-G) and Eb (Rb, ID-A, ID-B), and the request sent by the user C comprises the ID-A, the ID-C, Ea (Ra, ID-A, ID-G) and Ec (Rc, ID-A, ID-C).

The Eb (Rb, ID-A, ID-B) is a message encrypted by the user B with the shared key Kb, including the Rb, the ID-A and the ID-B, and the Ec (Rc, ID-A, ID-C) is a message encrypted by the user C with the shared key Kc, including the Rc, the ID-A, the ID-C.

Step 704: the KMS respectively finds out the Ka, the Kb and the Kc according to the plaintexts of the ID-A, the ID-B and the ID-C, then decrypts Ea (Ra, ID-A, ID-G), Eb (Rb, ID-A, ID-B) and Ec (Rc, ID-A, ID-C) with the Ka, the Kb and the Kc respectively, compares the result of decryption with the plaintexts of the ID-A and the ID-G, detects whether the ID-B and the ID-C are able to be mapped to the ID-G, if yes, the KMS generates a media root key K.

Step 705: the KMS encrypts the random numbers Ra, Rb and the root key K with the shared key Ka to obtain a message Ea (Ra, Rb, K), encrypts the root key K with the shared key Kb to obtain a message Eb (K), and then sends the two messages Ea (Ra, Rb, K) and Eb (K) to the user B;

the KMS encrypts the random numbers Ra, Rc and the root key K with the shared key Ka to obtain a message Ea (Ra, Rc, K), encrypts the root key K with the shared key Kc to obtain a message Ec (K), and sends the two messages Ea (Ra, Rc, K) and Ec (K) to the user C.

Step 706: the user B obtains the Eb (K), decrypts the Eb (K) with the shared key Kb to obtain the media root key K, and employs the predefined KDF to generate a media key Ka–b=KDF (K, Rb) which is shared with the user A according to the media root key K and the random number Rb generated by itself; the user C obtains the Ec (K), decrypts the Ec (K) with the shared key Kc to obtain the root key K, and employs the predefined KDF to generate a media key Ka–c=KDF (K, Rc) which is shared with the user A according to the media root key K and the random number Rc generated by itself.

Step 707: the user B, who responds the call, sends an OK response to the user A through the IMS network, and sends the message Ea (Ra, Rb, K) to the user A together with the OK response.

Step 708a: the IMS network forwards the OK response sent by the user B to the user A.

Step 708b: the IMS network sends a CANCEL message to the user C to stop the user C responding to the call.

Step 709: the user A receives the OK response, decrypts the message Ea (Ra, Rb, K) with the shared key Ka to obtain the Ra, Rb and media root key K, and employs the predefined KDF to generate the media key Ka–b=KDF (K, Rb) which is shared with the user B. Only the user B knows the media key, the user C cannot learn it.

According to the steps in FIG. 7, the secure media session can be realized between user A and user B with the Ka–b encryption.

The scheme of the present invention has relatively simple logic, reduces the calculation and processing pressure of the calling party, has less signaling interaction with the KMS, eases the storage and calculation requirements of the KMS, and well guarantees the security of the forking call session in the IMS. Specifically, compared with the SIP forking call session technology in traditional non-IMS, in the scheme of the present invention, the calling party only needs to calculate the media key which is shared with the called response party for one time, thus reducing the requirement on the calculation and processing capacity of the calling party, without any additional time delay. When the scheme of the present invention is compared with TBS scheme, in the TBS scheme, the KMS needs to generate a random number for all called parties and generate a unique media key for the called parties, however, in the present invention, no matter whether the called party refers to multiple terminals of one user or multiple users, the KMS only needs to generate an identical root key for all called parties, thus greatly reducing the requirement on the storage capacity and the calculation capacity of the KMS. Besides, compared with the TBS scheme, in the present invention, it is unnecessary to perform ticket request and response between the calling party and the KMS in advance, thus reducing the additional signaling interaction process.

The above descriptions are only preferred embodiments of the present invention, not used for defining the scope of the present invention. Various modifications, alterations and improvements depending on design requirements and other factors insofar should be included within the scope of the present invention.

INDUSTRIAL APPLICABILITY

It can be seen from the technical solution of the present invention that, based on the Otway-Rees key agreement protocol, with aid of the KMS, the media root key K used for generating the media key between the calling party and the called party is generated, and then each called party and the calling party can generate a media key by using the media Key Derivation Function (KDF) based on a random number generated by each called party and the media root key K generated by the KMS. Although the root key for generating the media key is identical for all called parties, as the random number of each called party is generated by itself and the other called parties cannot learn it, the media key generated based on the random number is unique for each called party and cannot be learned by other terminals, thus realizing the media security of the forking call session. The present invention proposes a key agreement mechanism based on Otway-Rees, to realize the secure forking call session in the IMS. The scheme of the present invention has relatively simple logic, reduces the calculation and processing pressure of the calling party, has less signaling interaction with the KMS, eases the storage and calculation requirements of the KMS, and well guarantees the security of the forking call session in the IMS.

Specifically, compared with the SIP forking call session technology in traditional non-IMS, in the scheme of the present invention, the calling party only needs to calculate the media key which is shared with the called response party for one time, thus reducing the requirement on the calculation and processing capacity of the calling party, without any additional time delay. When the scheme of the present invention is compared with TBS scheme, in the TBS scheme, the KMS needs to generate a random number for all called parties and generate a unique media key for the called parties, however, in the present invention, no matter whether the called party refers to multiple terminals of one user or multiple users, the KMS only needs to generate an identical root key for all called parties, thus greatly reducing the requirement on the storage capacity and the calculation capacity of the KMS. Besides, compared with the TBS scheme, in the present invention, it is unnecessary to perform ticket request and response between the calling party and the KMS in advance, thus reducing the additional signaling interaction process.

What is claimed is:

1. A method for realizing a secure forking call session, comprising:
    performing authentication between a calling party and a Key Management Server (KMS) or between each called party and the KMS, and acquiring a shared key between the calling party and the KMS or a shared key between each called party and the KMS;
    generating a random number by the calling party and calling each called party through an IP Multimedia Subsystem (IMS);
    generating a random number by each called party and acquiring a media root key from the KMS;
    generating a media key, which is shared with the calling party, by each called party according to the media root key and the random number generated by the called party;
    forwarding a message encrypted by the KMS containing the media root key and the generated random number by a called response party in the called parties, who responds to the call, to the calling party through the IMS network, wherein the message from the KMS to the called response party is encrypted with the shared key between the KMS and the calling party;
    generating a media key identical to that of the called response party by the calling party according to the media root key and the random number generated by the called response party; and
    performing a secure media session between the calling party and the called response party with the identical media key.

2. The method according to claim 1, further comprising:
    refusing response of other called parties by the IMS network after the called response party in the called parties responds the call.

3. The method according to claim 1, wherein the step that the calling party calls each called party comprises: the calling party uses an INVITE message to call all called parties through the IMS network, the INVITE message at least includes a user ID of the calling party, a common user ID of the called parties and a message $E_{calling\ party}$ encrypted with the shared key between the calling party and the KMS, and the message $E_{calling\ party}$ comprises the random number generated by the calling party, the user ID of the calling party and the common user ID of the called parties.

4. The method according to claim 3, wherein the step that each called party generates a random number and acquires the media root key from the KMS comprises:
    after receiving the INVITE message, each called party generates its own random number and initiates its own media root key request to the KMS, the media root key request at least includes the user ID of the calling party, a user ID of the called party, the received message $E_{calling\ party}$ and a messages $E_{called\ party}$ of the called party encrypted with the shared key between the called party and the KMS, and the message $E_{called\ party}$ comprises the random number generated by the called party, the user ID of the calling party and the user ID of the called party;
    the KMS uses the shared key with the calling party and the shared key with the called party to decrypt the message $E_{calling\ party}$ and the message $E_{called\ party}$ respectively, compares the decrypted user ID of the calling party, the common user ID of the called party and the user ID of the called party with plaintexts included in the media root key request, and generates the media root key after authenticating that the decrypted user ID of the calling party is consistent with that in the plaintexts, and authenticating that the user ID of the called party is consistent with the common user ID of the called party; and
    for each called party, the KMS encrypts the random number generated by the calling party, the random number generated by the called party and the media root key with the shared key between the KMS and the calling party, and encrypts the media root key with the shared key between the KMS and the called party to generates two encrypted messages, the two encrypted messages are sent to the called party; each called party decrypts the received messages with the shared key between itself and the KMS to obtain the media root key.

5. The method according to claim 1, wherein the step that each called party generates a media key which is shared between the called party and the calling party comprises: each called party generates the media key which is shared between itself and the calling party by using the obtained media root key and the random number generated by itself through predefined media Key Derivation Function (KDF).

6. The method according to claim 1, wherein the step that the called response party in the called parties, who responds the call, forwards the message encrypted by the KMS containing the media root key and the generated random number to the calling party comprises: the called response party sends a response message to the calling party through the IMS, and the called response party forwards the message obtained from the KMS to the calling party, wherein the message is encrypted with the shared key between the KMS and the calling party and includes the random number generated by the calling party, the random number generated by the called response party and the media root key.

7. The method according to claim 1, wherein the step that the calling party generates the media key identical to that of the called response party comprises:
    the calling party decrypts the received message by using the shared key with the KMS, wherein the received message includes the random number generated by the calling party, the random number generated by the called response party and the media root key which are encrypted with the shared key between the KMS and the calling party, and the calling party obtains the random number generated by the called response party and the media root key; and
    by using the decrypted media root key and the random number generated by the called response party, the calling party employs predefined Key Derivation Function (KDF) to generate the media key identical to that of the called response party.

8. The method according to claim 1, wherein
    the called party refers to multiple terminals of one user, and the terminals of the user have an identical user ID; or the called party refers to multiple users and each user has only one user terminal, and the users have a common user ID to which all users can be mapped.

9. The method according to claim 1, wherein the step of performing authentication between the calling party and the KMS or between each called party and the KMS comprises:
  establishing a security trust relationship between the calling party and the KMS or between each called party and the KMS through a General Bootstrapping Architecture (GBA) mode; and
  by the establishment of the trust relationship between the calling party and the KMS or between each called party and the KMS, a shared key is established between the calling party and the KMS or between each called party and the KMS.

* * * * *